Patented Dec. 20, 1949

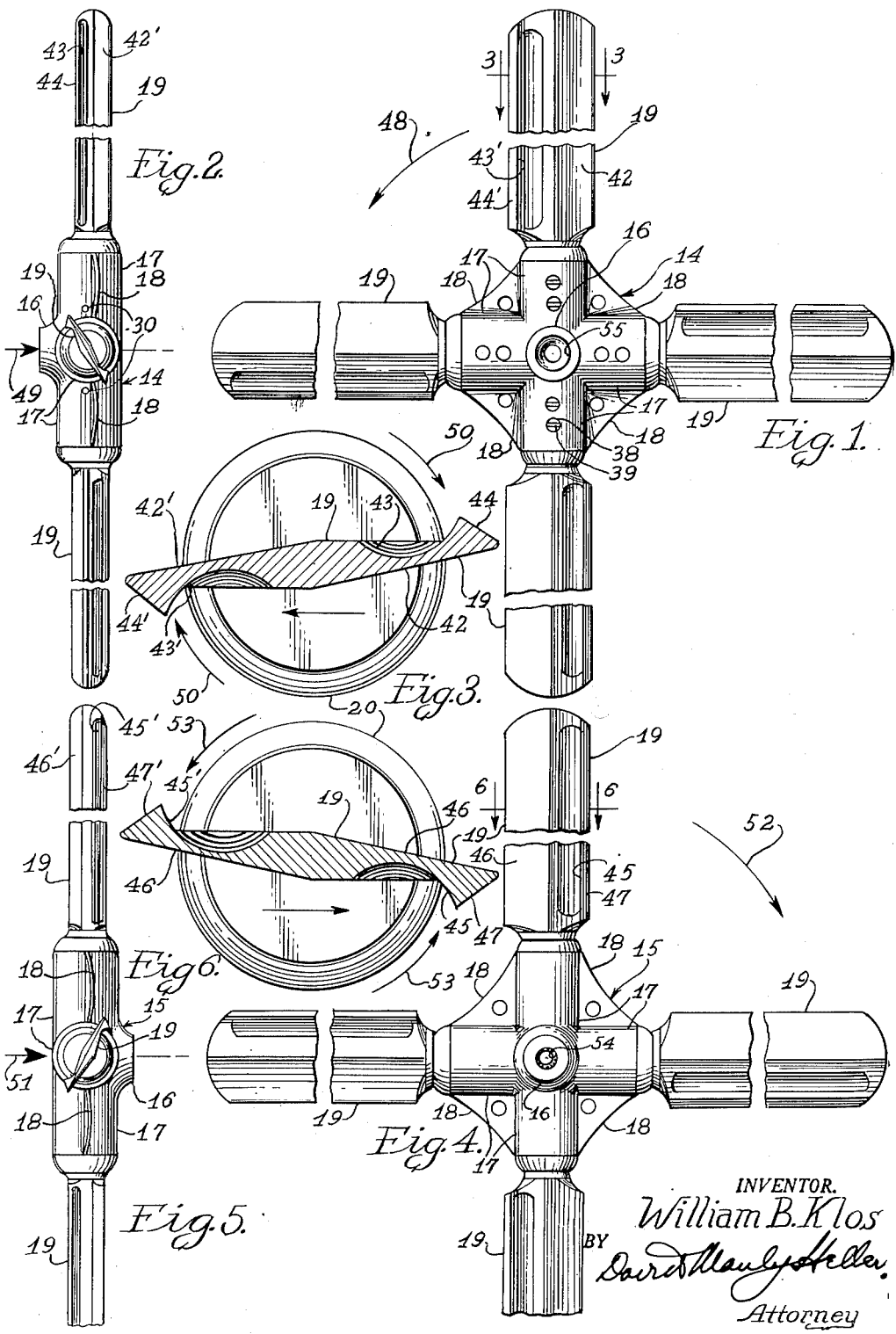

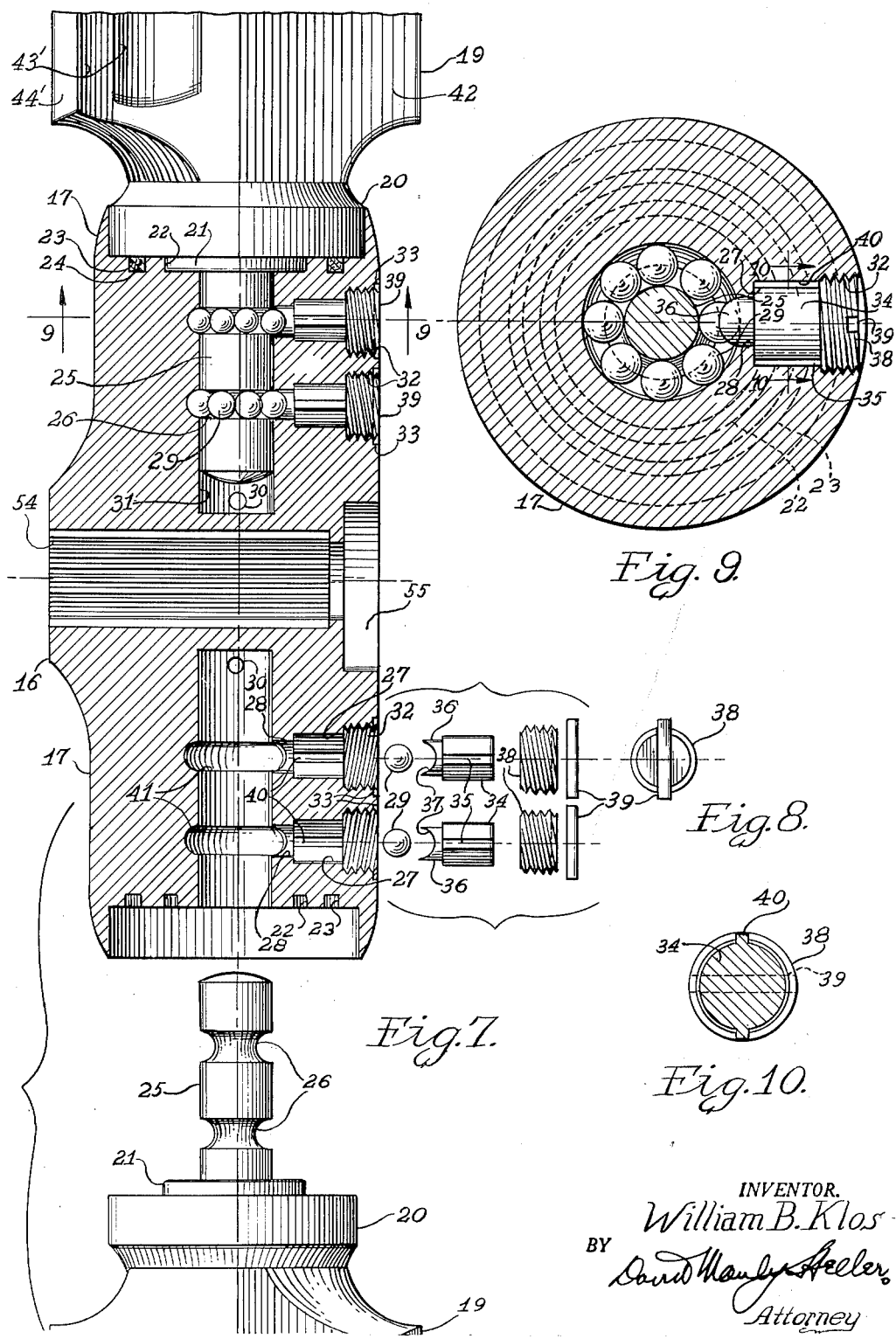

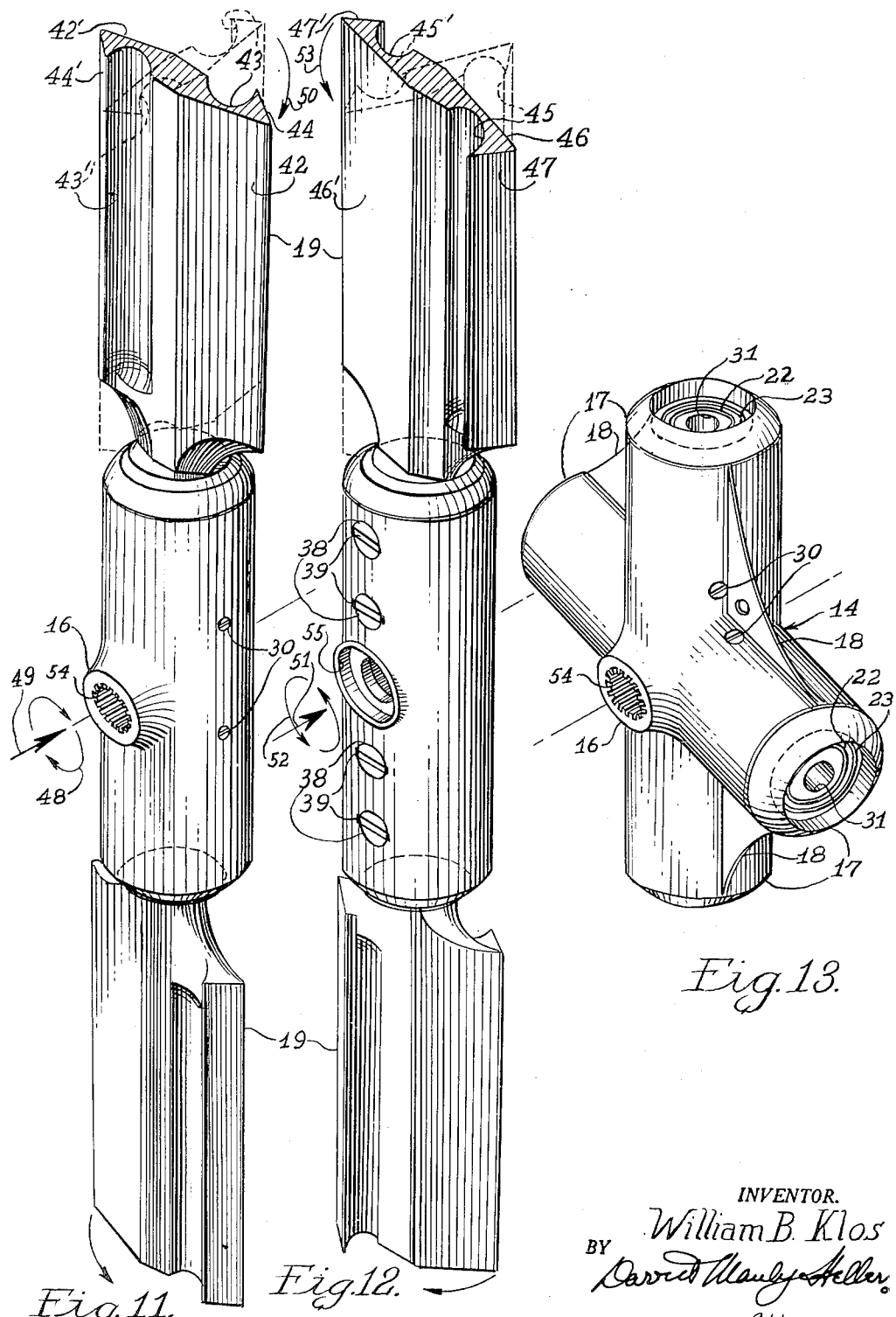

2,491,862

UNITED STATES PATENT OFFICE 2,491,862

AIRPLANE PROPELLER

William B. Klos, Chicago, Ill.

Application May 23, 1946, Serial No. 671,751

2 Claims. (Cl. 170—160.1)

My invention relates to airplane propellers.

An important object of my invention is to provide an airplane propeller of such construction that each blade is rotatably mounted in a hub structure and is free to rotate within an ambit of 360°, each blade being provided with an angular pitch surface which creates a thrust, whereas, the back of the pitch portion of the blade embraces a semi-cylindrical recess to buck the "backwash" of the air, creating a centrifugal pull in unison with an oppositely positioned blade, thus eliminating the vortex behind the blade. The structure comprising my invention thus distinguishes from standard construction in that the blades are freely rotatable about their axes, and are not rigidly or fixedly set.

Another object of my invention is to provide an airplane propeller which is automatic and self-adjusting with respect to the pitch changing action of the blade.

Another object of my invention is to provide in an airplane propeller construction novel ball-bearing means which is simple to assemble and economical to manufacture.

Another object of my invention is to provide a closure for a ball-bearing raceway having locking means for securing the same in position to form a true and completely closed annular ball-bearing raceway.

A further object of my invention is to provide an automatic propeller structure which is capable of being used in both applications of a push type propeller, or a tractor type propeller.

Another object of my invention is to provide an airplane propeller construction which can be altered from a tractor type of blade to a pusher type of blade.

A further object of my invention is to provide a blade structure which is rotatably mounted and which has oppositely and alternately disposed semi-cylindrical recesses back to back with oppositely and alternately disposed angular pitch portions or surfaces.

A further object of my invention is to provide an airplane propeller which has the foregoing attributes, which is practical in construction, efficient in its operation, and of such simple elemental structure as to lend itself readily to economical manufacture in quantity production.

Other features, and objects, resident in my invention can be readily deduced from the accompanying drawings, bearing further elucidation in the ensuing description wherein like parts are designated by like symbols, and in which:

Fig. 1 is a front view of a tractor or a pull type propeller.

Fig. 2 is an end view of Fig. 1.

Fig. 3 is a cross-sectional view taken, substantially, on line 3—3 of Fig. 1.

Fig. 4 indicates what is known as a push type of propeller, the illustration indicating a front view thereof.

Fig. 5 is an end view of Fig. 4.

Fig. 6 is a cross-sectional view taken, substantially, on the line 6—6 of Fig. 4.

Fig. 7 is an exploded view showing the hub structure of my propeller in cross-section and the method of attaching the individual blades thereto.

Fig. 8 is an end view of the locking means and key means used for retaining the closure of the ball-bearing race-way, an important elemental structure of my invention.

Fig. 9 is a cross-sectional view taken, substantially, on the line 9—9 of Fig. 7.

Fig. 10 is a cross-sectional view taken, substantially, on the line 10—10 of Fig. 9.

Fig. 11 is a perspective view of a dual blade tractor type propeller showing in enlargement the elemental detailed structure thereof.

Fig. 12 is a propeller made in accordance with the principles embraced in a push type of propeller.

Fig. 13 is a perspective view of the spider, or hub structure, to which the propeller blades may be interchangeably attached to form either type of propeller desired.

In the construction of airplanes, the propellers are, as a rule, either constructed of a solid non-adjustable blade, or as in later practices, the structure is provided with adjustable blades in order to furnish a pitch changing action so vitally essential to efficient flight. The pitch changing action provided on propeller blades is a rotational or angular adjustment of the blades rotating or moving about their longitudinal axes to afford therein angular adjustment, depending on the density of the air which becomes rarified as one ascends to certain heights, or when striking air pockets, or vacuum pockets, or when the engines are stalled and when it is desirable to have the blades change pitch outwardly as will be hereinafter explained in greater detail, so as to effectuate a cutting action with respect to the air and thus not impede the gliding movement of the plane which is to be brought to a safe landing.

At present, it appears that, a great many of the propellers manufactured are provided with pitch changing structure, which is primarily of a complex nature requiring remote control from the cockpit with complex mechanism performing the various adjustments which are controllable by the pilot. With my invention as distinguished from present practice, I believe, I have provided an advance in the art, in that I have constructed and found as an important improvement, the manufacture of automatically adjustable propeller blades to provide automatic pitch changing action for the propeller blades under the various conditions and changes of conditions during flight and hence requiring no attention on the part of the pilot.

Referring to the various views, in Figs. 1, 2 and 3, I show a propeller of the pull or tractor type which creates a thrust indicated by the arrow 49, and which when rotating in the direction of the arrows 48, that is, counter-clockwise, will afford a pitch changing action to the blade 19 thereof in a direction indicated in Fig. 3 by the arrow designated 50, or namely, clockwise when looking in the direction of the arrows 3—3. The propeller 19 is secured to a hub structure, and two or more propellers may be so secured, depending on requirements. In my illustration, I indicate preferably a four blade propeller construction although a dual blade, or six blade, or three blade propeller may be constructed just as readily with the teachings to be expounded hereinafter as illustrative of my invention, to be followed as a guide so that the average person familiar with the art will have no difficulty to practice my invention.

Each blade 19 is provided with an extension or collar 20 having an annular key structure of circular formation, which is designated 21, and which fits into an annular mating groove 22 within the hub section. Another annular groove concentric with the said groove 22, and designated 23, is also provided which is filled with packing or wicking 24 or other gasket means, and which provides lubrication for the rotation or the pitch changing action that is to take place when the blades 19 are subjected to such action. In order to assure smooth operation, the hub structure of my invention, generally designated 14 is comprised of a hub 16, having a web 18, and as many enlarged portions or sections 17 as there are propellers to be attached. Each section 17, referring to Fig. 7, can be seen to comprise suitable bored out openings 31 in order to receive the shank extension 25 of the propeller blade, these in turn being provided with annular recesses 26 of semicircular cross-section in order to register with the annular recesses 41 within the hub sections 17, thus when the extension 25 is fitted into the bore in the hub an annular recess is formed which will house the ball-bearings 29. Each annular recess communicates through a bore 28 with an enlarged bore 27 having key-ways 40 cut thereinto, and a threaded enlarged portion 32 at the terminus of which, and in transversal relationship with which, is associated a key-way 33. The said structure is adapted to receive the locating element for closing the race-way designated 34, having the keys 35 which fit into the aforementioned key-ways 40, the body 34 fitting the recess 27, whereas the extension 36 fits the reduced bore 28. Thus when the said closure plugs 34 are placed so that the keys 35 engage the key-ways 40, the semi-cylindrical end sections 37 thereof will close the annular recesses 41 providing confines for the ball-bearings 29 to be held therein and form a ball-bearing race-way of economical construction. The screw plugs 38 are each provided with a cross slot which is adapted to align with the keyway 33, so that when the said screw plugs 38 are brought down to bear on the elements 34, and locked in place by a key 39, a fixed closure will result which will not accidentally loosen, and the ball-bearings 29 will thus be maintained from escaping the race-way 41.

I also provide openings 30 to receive suitable cups through which a lubricant, such as mercury, may be fed into the pockets of the bore 31, below the end of the extension 25 which acts as I have found from my own experience as an excellent lubricant for the extension 25 and the race-way 41. The propeller hub is also provided with a splined central bore 54 in order to engage the driving shaft, and a counter-bored recess 55 such as it is common practice to use for the lock nut, or the locking means to secure rigidly the hub to the motivating shaft.

The effective operative portion of the propeller blade lies primarily in the cross-sectional configuration thereof, and as can be seen in Fig. 3, each propeller blade 19 has a dual section, the section on the right being in opposed relationship to that on the left, each section consisting of a thrust forming angular front portion 42, being backed up by the semi-cylindrical recessed section 43, the edges being angularly disposed so that they form a somewhat wider portion as indicated by the portion 44, and the oppositely disposed section consisting of a section 43′ cooperating with the section 43, and a front portion 42′ acting in concert with the angular portion 42, the thickened edge portion 44′ being of a similar angle to the portion 44. It is to be noted that the tractor or pull type of propeller is similar to that shown in Fig. 1, the tractor type being illustrated in Figs. 4, 5 and 6, with the exception that the relative position of the semi-cylindrical rear recesses or cut-outs 45 and 45′ are in opposite relationship to those indicated in Fig. 3 defining the propeller known as the pull type of propeller. In this case, the propeller is also made up of two sections and has the angular thrust or front portions 46 and 46′, the rear portions 47 and 47′, and the intermediate portions back to back to the said angular thrust portions, and designated 45 and 45′, the purpose of which will be hereinafter more clearly elucidated.

In Figs. 1, 2 and 3 when the plane is traveling to the left creating a thrust in the direction of the arrow 49, and the propeller 14 is rotated in the direction indicated by the arrows 48, the automatic pitch changing action occurs in the direction of rotation indicated by the arrows 50 of Fig. 3. In the type illustrated and, generally designated 15, Figs. 4, 5 and 6, when the thrust is in the direction of the arrow 51, and the propeller is rotating in the direction of the arrow 52, the pitch changing action takes place in the direction indicated by the arrow 53.

In actual practice, a propeller made in accordance with the principles hereinbefore expounded as adducing the advantages inherent in my invention will result in the following ancillary benefits and attributes. When a plane is traveling, and soaring to a great height, as the different heights are progressively reached, and different rarified atmospheric conditions are encountered, the propeller, according to my invention and experiments will automatically change the pitch of the blade to compensate for the variation. If a vacuum pocket is reached, the blade will be positioned almost at right angles to the direction of motion 48, thus increasing the resistance to a great extent so that the propellers will not rotate too rapidly, in other words, the propeller blades will be forced to rotate more slowly. If the motor should stall, and it be necessary to reach a safe landing through gliding manipulations of the plane, the blades will automatically be positioned by the resistance of the air to a position whereby the leading edges of the blade confined in the angular section between the surfaces 42 and 44, and 47 and 46, so that they will more or less cut the air minimizing the resistance and thus not tend to interfere with the descent of the plane. On the other hand, in combat planes and in other emergencies where one of the propeller blades may be broken throwing the entire arrangement off balance, and it be found necessary to stop the engine, the remaining blade or blades will automatically change pitch to the position wherein the least resistance to the air will be afforded and thus not impair the gliding action attempted by the pilot to make a safe landing.

Some attributes of my structure hereinbefore described is that it is more efficient; it provides automatic pitch changing action which has been clearly described and explained hereinabove; it is more beneficial than the rigid blades, in that it becomes yieldable to and compensatable for yieldable atmospheric conditions. Noise is eliminated, and the blades may be readily interchanged by the normal ball-bearing race structure which I have provided. It is to be stressed that the blade extension being equipped with the race-ways operating on ball-bearings offers a frictionless mounting. To ease the pitch changing action each blade has an angular pitch which creates a thrust, whereas the groove of semi-cylindrical formation on the back of the thrust portion bucks what is known as the "backwash" to create a centrifugal pull in unison with oppositely disposed blades, thus eliminating the vortex usually created behind the blades. This in turn also increases the efficiency of operation of airplane propellers constructed in accordance with the principles hereinbefore expounded.

A propeller constructed in accordance with my invention gives effective performance, pushing or pulling to capacity, depending on the nature of the propeller, and far more efficiently than ordinary propellers, at all times changing pitch automatically of its blades when conditions arise warranting such action. It is to be understood that any modification incident to variation of length of blades or the degrees of pitch or camber do not include or involve anything more than structural changes. It will be understood that modifications in several structural features of the invention may be made without departing from the spirit or nature of the invention, and I wish the invention to be construed as of the scope defined in the subjoined claims.

Having thus described and disclosed my invention, what I claim as novel, and desire to secure by Letters Patent, is:

1. An automatic pitch changing propeller comprising, a hub element, and at least two propeller blades substantially of rhombic cross-sectional configuration rotatably secured thereto, each propeller blade having alternately disposed side sections in relatively opposed relationship, the said side sections consisting of angularly disposed thrust face portions, angularly disposed side portions contiguous thereto, and semi-cylindrically recessed portions behind the said thrust face portions.

2. An automatic pitch changing propeller comprising, a hub element provided with at least two oppositely disposed bored openings, two propeller blade elements of substantially rhombic cross-sectional configuration each having reduced extensions secured rotatably to the said bored openings, annular ball bearing raceway means formed compositely on the said reduced extensions and the said bored openings, transverse bores and keyways on the said hub element communicating with the said annular ball bearing raceway means and having counter-bored threaded openings, closure plug means provided with key means slidably fitted to the said bores and keyways and provided with a reduced extension having a semi-cylindrical concavity to register with the said annular ball bearing raceway means, plug means provided with slotted means secured within the said counter-bored threaded openings, and key means fitted within the said slotted means and notches in the said counter-bored threaded openings to prevent accidental displacement thereof.

WILLIAM B. KLOS.

REFERENCES CITED

The following references are of record in the file of this patent:

UNITED STATES PATENTS

| Number | Name | Date |
| --- | --- | --- |
| 1,598,321 | Sherwood | Aug. 31, 1926 |
| 1,600,654 | Stodder | Sept. 21, 1926 |
| 1,825,473 | Pemsl | Sept. 29, 1931 |
| 1,884,881 | Schmitthenner | Oct. 25, 1932 |
| 1,951,321 | Blanchard | Mar. 13, 1934 |
| 1,977,072 | Lyman | Oct. 16, 1934 |
| 2,054,947 | Riddle | Sept. 22, 1936 |
| 2,264,568 | Hamilton | Dec. 2, 1941 |
| 2,315,574 | Anderson | Apr. 6, 1943 |
| 2,319,335 | Martinotti | May 18, 1943 |
| 2,322,352 | Frazier | June 22, 1943 |
| 2,333,166 | Fraser | Nov. 2, 1943 |

FOREIGN PATENTS

| Number | Country | Date |
| --- | --- | --- |
| 16,414 | Great Britain | 1913 |
| 379,647 | Great Britain | Sept. 1, 1932 |